United States Patent
Krisztian et al.

(10) Patent No.: US 12,129,937 B2
(45) Date of Patent: Oct. 29, 2024

(54) ALTERNATIVE SUBPROCESS FOR TAPING WRAPPED SILICON HOSES AND HOSE MANUFACTURED THEREBY

(71) Applicant: ContiTech Techno-Chemie GmbH, Karben (DE)

(72) Inventors: Martin Krisztian, Satu Mare (RO); Kristina Maurer, Satu mare (RO); Emil Moldovan, Arad (RO); Flavius Toderesc, Carastelec (RO); Günther Veibel, Satu Mare (RO)

(73) Assignee: ContiTech Techno-Chemie GmbH, Karben (DE)

( * ) Notice: Subject to any disclaimer, the term of this patent is extended or adjusted under 35 U.S.C. 154(b) by 61 days.

(21) Appl. No.: 17/804,172

(22) Filed: May 26, 2022

(65) Prior Publication Data
US 2022/0381376 A1    Dec. 1, 2022

(30) Foreign Application Priority Data
May 31, 2021  (EP) .................................... 21176779

(51) Int. Cl.
*F16L 11/08*     (2006.01)
*B29D 23/00*     (2006.01)
(Continued)

(52) U.S. Cl.
CPC ............ *F16L 11/085* (2013.01); *B29D 23/00* (2013.01); *B29K 2083/00* (2013.01); *B29K 2105/02* (2013.01)

(58) Field of Classification Search
CPC ... F16L 11/085; B29D 23/00; B29K 2083/00; B29K 2105/02
(Continued)

(56) References Cited

U.S. PATENT DOCUMENTS

| | | | |
|---|---|---|---|
| 2,984,262 | A | 5/1961 | Aymami |
| 3,927,695 | A | 12/1975 | Crockwell |

(Continued)

FOREIGN PATENT DOCUMENTS

| | | | |
|---|---|---|---|
| CN | 103090128 A | 5/2013 | |
| CN | 104081098 A | 10/2014 | |

(Continued)

OTHER PUBLICATIONS

European Search Report dated Nov. 10, 2021 of EP application 21176779.3 on which is application is based.
(Continued)

*Primary Examiner* — David R Deal
(74) *Attorney, Agent, or Firm* — Richard A. Wolf; Gregory J. Adams

(57) ABSTRACT

A hose includes an outer cover layer and at least one ply disposed inward from the outer cover layer, characterized in that the outer cover layer is a shrink sleeve, and where the at least one ply is formed from a reinforced silicone rubber sheet which includes a reinforcement. The hose may further include an inner layer disposed within the at least one ply, and which defines a lumen. The shrink sleeve may be a polyolefin shrink sleeve. The layers are tensioned together with the shrink sleeve. The hose may be prepared by a shrink tension method without the use of a tape wrap. A method of preparing the above hose may include wrapping the inner layer around a mandrel, wrapping the at least one at least one ply around the inner layer, pulling the shrink sleeve over the at least one at least one ply, and vulcanizing the hose.

17 Claims, 3 Drawing Sheets

(51) Int. Cl.
 B29K 105/02 (2006.01)
 B29K 83/00 (2006.01)
(58) Field of Classification Search
 USPC .......................................................... 138/126
 See application file for complete search history.

(56) References Cited

U.S. PATENT DOCUMENTS

| | | | |
|---|---|---|---|
| 4,035,534 | A | 7/1977 | Nyberg |
| 7,939,615 | B2 | 5/2011 | Ou et al. |
| 8,176,943 | B2* | 5/2012 | Stroempl ................ F16L 57/04 |
| | | | 138/143 |
| 8,291,941 | B1 | 10/2012 | Berardi |
| 2006/0118195 | A1 | 6/2006 | Arima |
| 2006/0182914 | A1 | 8/2006 | Yasumatsu et al. |
| 2009/0126821 | A1 | 5/2009 | Domonkos |
| 2012/0145275 | A1 | 6/2012 | Seebold et al. |
| 2014/0124080 | A1 | 5/2014 | Hellfeier et al. |
| 2014/0251482 | A1* | 9/2014 | Pike ..................... F16L 11/124 |
| | | | 138/109 |
| 2015/0027578 | A1 | 1/2015 | Pearce |
| 2017/0307042 | A1 | 10/2017 | Zander et al. |
| 2020/0101691 | A1 | 4/2020 | Piwonski |

FOREIGN PATENT DOCUMENTS

| | | |
|---|---|---|
| CN | 104169075 A | 11/2014 |
| CN | 104582915 A | 4/2015 |
| CN | 110461572 A | 11/2019 |
| EP | 1302511 A2 | 4/2003 |
| JP | H03229088 A | 10/1991 |
| JP | 2000025121 A | 1/2000 |
| JP | 2003214566 A | 7/2003 |
| JP | 2009024839 A | 2/2009 |
| JP | 2019138312 A | 8/2019 |
| WO | 1999036194 | 7/1999 |

OTHER PUBLICATIONS

Chinese Office Action dated Jun. 29, 2023 with corresponding Chinese Patent Application No. 202210600853.3.
Chinese Office Action dated Jan. 30, 2024 in corresponding Chinese Patent Application No. 202210600853.3 and English translation thereof.

* cited by examiner

ALTERNATIVE SUBPROCESS FOR TAPING WRAPPED SILICON HOSES AND HOSE MANUFACTURED THEREBY

CROSS REFERENCE TO RELATED APPLICATION(S)

This application is a national application filed under 35 U.S.C. 111(a) which claims priority to European patent application number 21176779.3, filed May 31, 2021, the entire contents of which is incorporated herein by reference.

TECHNICAL FIELD

The invention concerns in general to methods for making a silicone hoses and hoses made thereby, where the hose includes at least a reinforced silicone rubber layer and a polyolefin heat shrinkable material covering the reinforced silicone rubber layer and which is applied prior to curing the hose.

BACKGROUND

The state of the art describes curable silicone compositions which are used in a variety of reinforced hose applications which ranges from the automotive industry to medical devices. Such compositions are used to form a hose in so called in the wrapped silicon hose manufacturing. In a wrapped silicon hose manufacturing process, a taping subprocess is used for ensuring adhesion between silicone layers during a later vulcanization curing process. To generate adhesion between the silicone layers, layers of binder tape (i.e. cellulose tape) are applied on the hose surface to consolidate the silicone layers preform. This process step is required for all preforms made without set-cured materials. After curing, to extract the hose, the plies of cellulose must be de-taped, or otherwise removed. The used tape is then discarded.

Also, the taping process is performed by using "orbital winders", which is time and work consuming. Furthermore, only highly trained and skilled operators are typically required to complete such a complex task. In addition to orbital winders, other requisite specialized equipment/personal includes tape wetting machines/operators, operators for de-taping and extraction, as well as chucks for holding the mandrels used in the wrapping process. Additionally, once the hoses have completed the curing cycle, they must be cooled and soaked in a tank of water. The water bath is required to rehydrate the cellulose acetate binder tape so that it easily releases from the hose surface, as well as for ease to cut.

SUMMARY

The goal of the invention is to use a silicon hose manufacturing process which avoids the use of a taping subprocess, and other related subprocesses, while still providing a cured reinforced silicon hose. Such goal is achieved by using industrial grade shrink tubes/sleeves, such as polyolefin shrink sleeves, (collectively "shrink sleeves") for tightening the wrapped reinforced silicon layers together, in place of using layers of adhesive tape. Such a manufacturing method will be referred to herein as a "shrink tension method" or "ST method".

Some advantages of the shrink tension method process include less time consumption in comparison to a traditional the taping process, as well as lower manpower requirements. The shrink tension method also provides easier recyclability and significantly less waste. Less specialized equipment is required, as well as a reduction in the possibility of human error. The shrink tension method eliminates the requirement of hose forming with cellulose tape and de-taping. Lastly, the ST method is feasible for shaped hoses and linear hoses.

A wrapped silicon hose manufacturing process using a shrink tension method according to this inventive disclosure includes first cutting a calendared silicone rubber/reinforcement material to length, thus creating blank reinforced silicone sheets, hereinafter also referred to as "blanks". Then preforming is achieved by wrapping up a plurality of blanks on a mandrel with a specific diameter and shape, thus creating a preform. A shrink sleeve is pulled over the preform and is preheated in order to enable a tight/snug fit of the shrink sleeve over the preform. In some aspects, the pulling on the mandrel of the preform and the shrink sleeve may be done while these materials are still warm or hot and flexible. Also, the shrink sleeve may be used to control the shape of the uncured hose, and provides necessary pressure for vulcanization.

In some cases, after vulcanization and extracting the hose from the forming mandrel, it is not necessarily required to remove the shrink sleeve, as the shrink sleeve and outermost reinforced silicon layer are bonded together, thus adding mechanical and abrasive protection. The vulcanized semi-finished product may then be cut to the right length/shape, printed with the necessary labels, assembled and then checked.

Any conventionally known silicone rubbers are usable as the silicone rubber for the sheets. Some non-limiting examples of silicone rubbers useful to prepare the reinforced silicone sheets, include silicone rubbers of high temperature vulcanizable type (HTV), silicone rubbers of room temperature vulcanizable type (RTV) and liquid silicone rubbers of low temperature vulcanizable type (LTV). The silicone rubber composition may have a Mooney viscosity of 60 to 120, or even 60 to 100, at 50° C. in the unvulcanized state after being kneaded for the production of the sheets.

A reinforcement layer, such as a textile material, is embedded between a first silicone rubber layer and a second silicone rubber layer in the sheet. This may be formed by any suitable process, such as a calendaring process for example. The reinforcement layer is composed of a knit, in particular based on a textile material, in particular in turn composed of yarns. The materials relevant here can be a polyamide (PA), a polyimide (PI), an aramid, a para-aramid, a meta-aramid, a polyvinyl acetal (PVA), polyvinyl alcohol (PVAL), cotton (CO), modal (CMD), rayon (CV), a polyetheretherketone (PEEK), a polyester, in particular polyethylene therephthalate (PET) or polyethylene 2,6-naphthalate (PEN), a polysulfone (PSU), a polyoxadiazole (POD), polybenzoxazole (PBO), polyphenylene, a polyphenylene derivative, steel, or even brass. Hybrid designs, for example in the form of a mixed yarn can also be used.

The hose may further include an inner layer in some cases. The inner layer may be formed from unblended ethylene-acrylate rubber (AEM), an AEM blend, unblended acrylate rubber (ACM), an ACM blend, fluororubber, or silicone rubber. The inner layer may be the innermost layer of the hose, and a lumen of the hose is defined therein.

The silicone rubber hose produced according to the disclosure can have inner diameter of from about 30 mm to about 100 mm and a thickness of about 2 mm to about 12 mm. In some cases, the silicone rubber hose has an inner diameter of about 30 mm to about 70 mm and a thickness of about 3 mm to about 10 mm. Hoses according to the disclosure include, but are not limited to, air induction hoses, charge-air hoses, coolant hoses, and the like.

BRIEF DESCRIPTION OF DRAWINGS

The present disclosure may be better understood, and its numerous features and advantages made apparent to those skilled in the art by referencing the accompanying drawings, where.

DETAILED DESCRIPTION

Figure 1:
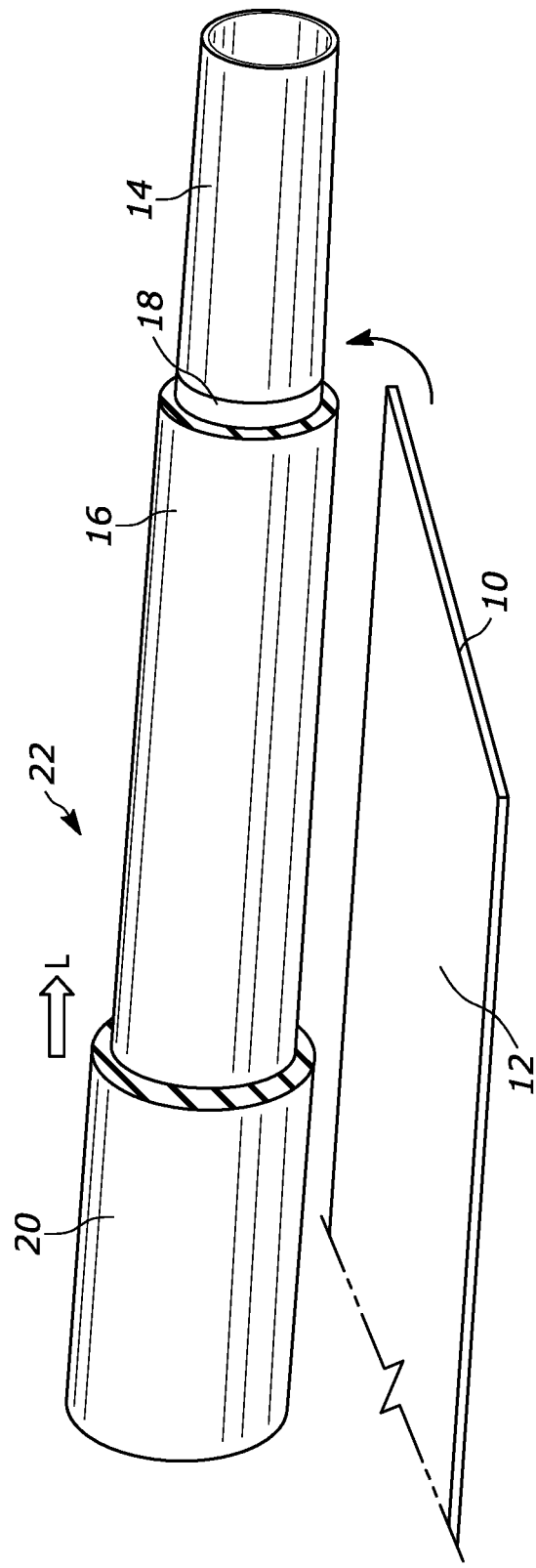
FIG. 1 is a fragmentary perspective view generally illustrating the formation of a hose by application of the layers onto a mandrel.

Now referring to FIG. 1, a sheet 10, may be employed in making the hose. The sheet 10 may include reinforcement layer 12, such as a textile material, embedded between a first silicone rubber layer and a second silicone rubber layer in the sheet 10. The textile material 12, may be suitably formed from any of the conventionally known types of fabric material, the fabric being employed in the production of these types of hose generally being of a square woven, slit or bias-cut form. The sheet 10 is formed for application on mandrel 14 by dividing the fabric into the strips of the desired width, the width of the strip being dimensioned so as to encircle the mandrel 14 the desired number of times to form the desired number of plies 16. For example, sheet 10 may be sufficiently sized to wrap around the mandrel 14 so as to form, two, three, four, five, etc. plies 16 of reinforced silicone sheet 10 about the mandrel 14. Where used, an inner layer 18 may be applied to mandrel 14, prior to application of reinforced silicone sheet 10 there upon.

After building the desired number of plies 16 on mandrel 14, a shrink sleeve 20 is then pulled in direction L to cover the outer surface of plies 16. The hose 22 is then cured, typically in a vulcanization oven.

Figure 2:
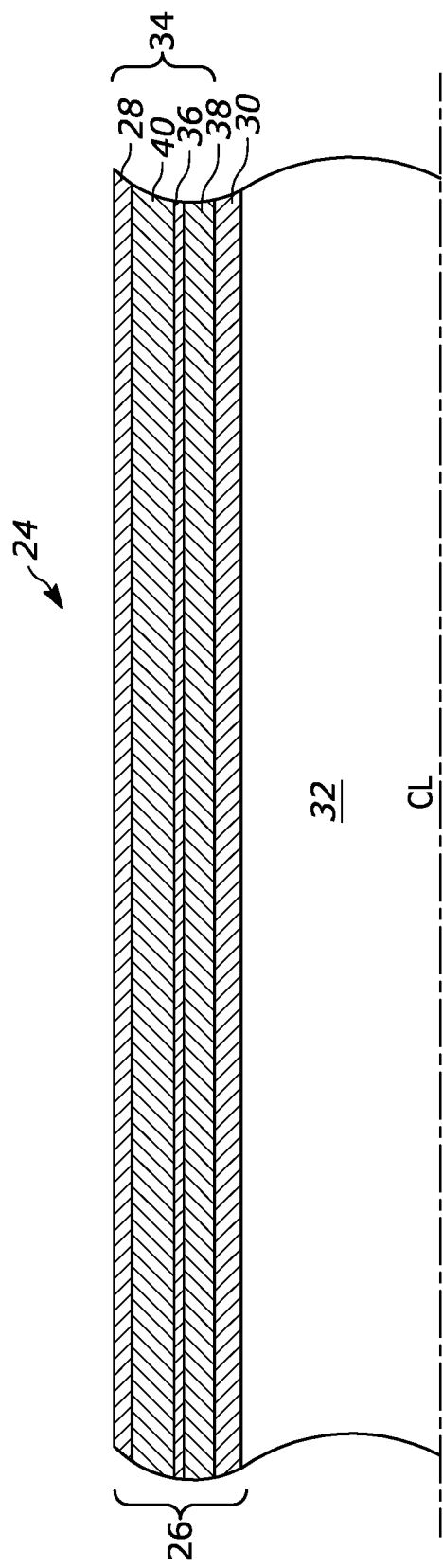
FIG. 2 shows a cross-section view illustrating an example of a wall structure of linear silicone rubber hose according to an embodiment of the invention.

With reference to FIG. 2, hose 24 is half of a liner hose with a wall structure 26 shown. In this view, the centerline of the hose is indicated as 'CL'. The wall structure 26 includes cover layer 28 formed from a shrink sleeve, such as polyolefin shrink sleeve or the like, and inner layer 30, which defined hose lumen 32. Between cover layer 28 and inner layer 30 is at least one layer/ply of reinforced silicone sheet 34. While one ply of reinforced silicone sheet is shown, it is within the scope of this embodiment that a plurality of reinforced silicone sheet plies is used. Reinforced silicone sheet 34 includes reinforcement layer 36 embedded between a first silicone rubber layer 38 and a second silicone rubber layer 40.

Figure 3:
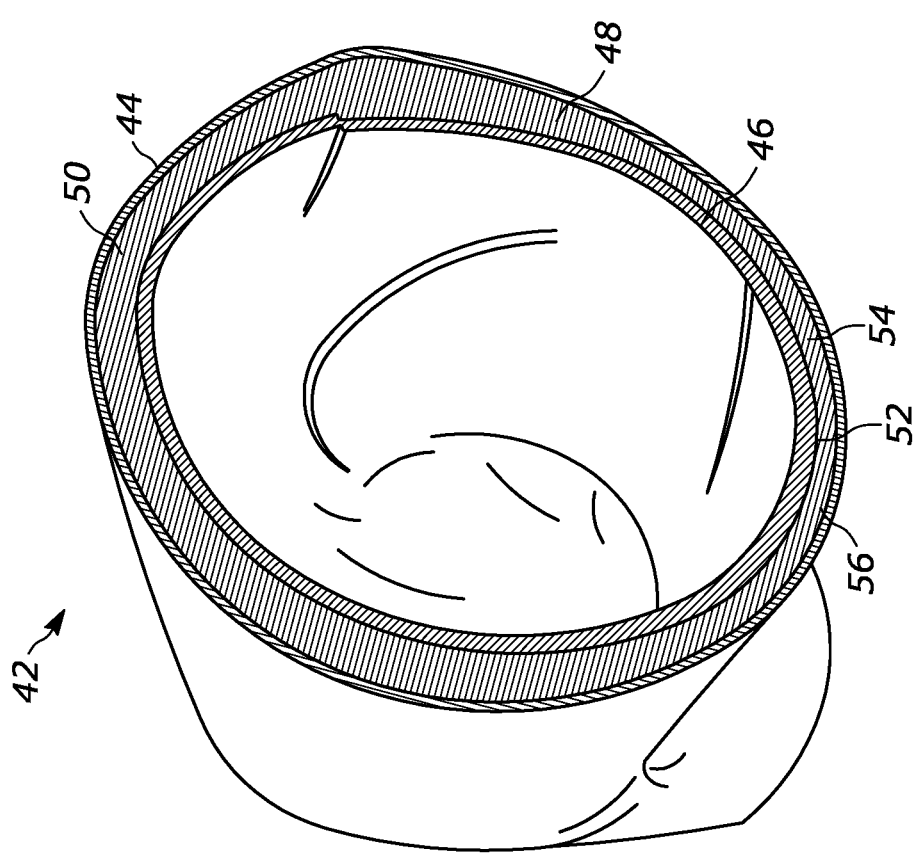
FIG. 3 is a perspective view illustrating a shaped, or otherwise non-linear, silicone rubber hose according to an embodiment of the invention.

Now referring to FIG. 3, which depicts a shaped, or otherwise non-linear, silicone rubber hose 42. Hose 42 includes outer cover layer 44 formed from a shrink sleeve, such as polyolefin shrink sleeve or the like, and inner layer 46. Between cover layer 44 and inner layer 46 is a plurality of plies 48 formed of a reinforced silicone sheet. Which each ply is a reinforcement 50 sandwiched between a first silicone rubber layer and a second silicone rubber layer. Three plies 52, 54, 56 of a reinforced silicone sheet are shown, and while three plies of the reinforced silicone sheet are shown, it is within the scope of this embodiment that any number of reinforced silicone sheet plies may be used. Shaped hoses according the disclosure are also formed on a shaped mandrel.

LIST OF REFERENCE SIGNS (PART OF THE DESCRIPTION)

10 Reinforced silicone rubber sheet
12 Reinforcement layer
14 Mandrel
16 Plies
18 Inner layer
20 Polyolefin shrink sleeve
22 Hose
24 Hose
26 Hose wall structure
28 Cover layer (shrink sleeve)
30 Inner layer
32 Hose lumen
34 Reinforced silicone sheet/ply
36 Reinforcement layer
38 First silicone rubber layer
40 Second silicone rubber layer
42 Hose
44 Cover layer (polyolefin shrink sleeve)
46 Inner layer
48 Reinforced silicone sheet plies
50 Reinforcement
52 First reinforced silicone sheet ply
54 Second reinforced silicone sheet ply
56 Third reinforced silicone sheet ply

The invention claimed is:

1. A hose comprising:
an outer cover layer, and
a reinforcement layer disposed inwardly from the outer cover layer,
wherein the outer cover layer is a shrink sleeve,
wherein the reinforcement layer includes a plurality of reinforcement plies arranged radially adjacent to each other, each of the plurality of reinforcement plies being formed from a reinforced silicone rubber sheet having silicone rubber on at least one side of a textile reinforcement,
wherein the shrink sleeve forming the outer cover layer is configured to apply sufficient tension during vulcanization to generate adhesion and consolidation of the radially adjacent reinforced silicone rubber sheets such that the textile reinforcements are embedded between layers of the silicone rubber in the reinforcement layer of the hose.

2. The hose according to claim 1 further comprising an inner layer disposed inwardly from the reinforcement layer, and wherein the inner layer defines a lumen of the hose.

3. The hose according to claim 2, wherein the inner layer comprises one or more of unblended ethylene-acrylate rubber (AEM), an AEM blend, unblended acrylate rubber (ACM), an ACM blend, fluororubber, and silicone rubber.

4. The hose according to claim 1, wherein the shrink sleeve is a polyolefin shrink sleeve.

5. The hose according to claim 1, wherein the hose is a linear hose that extends linearly along a longitudinal axis.

6. The hose according to claim 1, wherein the hose is a shaped hose that is permanently formed into a shape having at least one bend along its length.

7. The hose according to claim 1, wherein the shrink sleeve of the outer cover layer is directly bonded to an outer surface of a radially outermost reinforcement ply of the plurality of reinforcement plies.

8. The hose according to claim 1 having a wall thickness of from 2 mm to 12 mm.

9. The hose according to claim 1, wherein the textile reinforcement is composed of a knit.

10. The hose according to claim 9, wherein the knit is composed of yarns.

11. The hose according to claim 1, wherein the textile reinforcement comprises one or more members from the group consisting of a polyamide (PA), a polyimide (PI), an aramid, a para-aramid, a meta-aramid, a polyvinyl acetal (PVA), a polyvinyl alcohol (PVAL), cotton (CO), modal (CMD), rayon (CV), a polyetheretherketone (PEEK), a polyester, a polyethylene therephthalate (PET), a polyethylene 2,6-naphthalate (PEN), a polysulfone (PSU), a polyoxadiazole (POD), a polybenzoxazole (PBO), a polyphenylene, a polyphenylene derivative, steel, and brass.

12. The hose according to claim 1, wherein the silicone rubber of the reinforced silicone sheet comprises one or more types of silicone rubber(s) selected from the group consisting of a high temperature vulcanizable type (HTV), a room temperature vulcanizable type (RTV) and liquid silicone rubbers of low temperature vulcanizable type (LTV).

13. A method of preparing a hose, the method comprising:
wrapping a plurality of reinforcement plies around a mandrel so that the reinforcement plies are arranged radially adjacent to each other, each of the plurality of reinforcement plies being formed from a reinforced silicone rubber sheet having silicone rubber on at least one side of a textile reinforcement;
applying a shrink sleeve over the plurality of reinforcement plies;
vulcanizing the hose; and,
removing the mandrel;
wherein during the vulcanizing, the shrink sleeve applies sufficient tension to venerate adhesion and consolidation of the radially adjacent reinforced silicone rubber sheets such that the textile reinforcements are embedded between layers of the silicone rubber and forms a reinforcement layer of the hose, without the use of a tape wrap, and
wherein the shrink sleeve remains to form the outer cover of the hose.

14. The method according to claim 13, wherein the applying the shrink sleeve is done by pulling on the shrink sleeve while the shrink sleeve is warm or hot and flexible.

15. The method according to claim 13, further comprising wrapping at least one inner layer around the mandrel before the wrapping the plurality of reinforcement plies, in which the at least one inner layer defines a lumen of the hose.

16. The method according to claim 13, wherein the shrink sleeve is a polyolefin shrink sleeve.

17. The method according to claim 13, wherein the shrink sleeve of the outer cover layer is directly bonded to an outer surface of a radially outermost reinforcement ply of the plurality of reinforcement plies.

* * * * *